(12) United States Patent
Wallman et al.

(10) Patent No.: US 10,393,184 B2
(45) Date of Patent: Aug. 27, 2019

(54) MOUNTING TOOL FOR WHEEL BEARING ASSEMBLIES

(71) Applicant: Wallmek i Kungälv AB, Kungälv (SE)

(72) Inventors: Niklas Wallman, Kungälv (SE); Sten Johansson, Kungälv (SE); Martin Hasselskog, Kungälv (SE)

(73) Assignee: WALLMEK I KUNGÄLV AB, Kungälv (SE)

( * ) Notice: Subject to any disclaimer, the term of this patent is extended or adjusted under 35 U.S.C. 154(b) by 236 days.

(21) Appl. No.: 15/204,525

(22) Filed: Jul. 7, 2016

(65) Prior Publication Data

US 2017/0014981 A1 Jan. 19, 2017

(30) Foreign Application Priority Data

Jul. 16, 2015 (EP) .................................... 15177000

(51) Int. Cl.
*F16C 41/00* (2006.01)
*B25B 27/06* (2006.01)

(52) U.S. Cl.
CPC ............ *F16C 41/00* (2013.01); *B25B 27/064* (2013.01); *F16C 2226/00* (2013.01); *F16C 2226/12* (2013.01); *F16C 2326/02* (2013.01)

(58) Field of Classification Search
CPC .. F16C 41/00; F16C 2226/12; F16C 2326/02; B25B 27/064
See application file for complete search history.

(56) References Cited

U.S. PATENT DOCUMENTS

| 1,123,513 A | 1/1915 | Gaillard |
|---|---|---|
| 1,794,494 A | 3/1931 | Noble |
| 3,060,559 A | 10/1962 | Levenson |
| 3,568,294 A | 3/1971 | Conner |

(Continued)

FOREIGN PATENT DOCUMENTS

| DE | 199 09 274 A1 | 2/2000 |
|---|---|---|
| DE | 20 2005 017 468 U1 | 1/2006 |

(Continued)

OTHER PUBLICATIONS

European Search Report dated 11, 2016.

(Continued)

*Primary Examiner* — Rick K Chang (74) *Attorney, Agent, or Firm* — Buchanan Ingersoll & Rooney P.C.

(57) ABSTRACT

A mounting tool and a method for mounting a wheel bearing assembly, having an inner ring flange and an outer bearing ring, into a bearing seat of an axle body of a vehicle are disclosed. The mounting tool includes a supporting member, two L-shaped holding members, which can be fastened at various positions along the supporting member, and at least one securing means for fastening the L-shaped holding members to the supporting member. The holding members each have a foot section with a recess, the foot sections being insertable in an intermediate space between the inner ring flange and the outer bearing ring in order to engage the outer bearing ring. Each recess has a shape configured to apply an evenly distributed pressure to outer bearing rings of several different dimensions. Hereby a flexible and versatile mounting tool is provided.

8 Claims, 7 Drawing Sheets

(56) References Cited

U.S. PATENT DOCUMENTS

| | | | |
|---|---|---|---|
| 4,492,014 A | | 1/1985 | Alexander |
| 4,965,921 A | | 10/1990 | Priest |
| 4,989,311 A | * | 2/1991 | Rosin .................... B25B 27/023 29/259 |
| 5,896,639 A | * | 4/1999 | Chen .................... B25B 27/026 29/261 |
| 2006/0053609 A1 | | 3/2006 | Wridth |
| 2009/0194750 A1 | | 8/2009 | Fan |
| 2012/0102704 A1 | | 5/2012 | Barrios et al. |
| 2014/0310936 A1 | | 10/2014 | Manno |

FOREIGN PATENT DOCUMENTS

| | | |
|---|---|---|
| DE | 10 2008 007 805 A1 | 9/2009 |
| DE | 102011010020 A1 | 9/2011 |
| DE | 20 2011 052 085 U1 | 1/2012 |
| DE | 20 2011 108 271 U1 | 2/2012 |
| DE | 10 2012 006 700 A1 | 10/2012 |
| DE | 20 2015 102 949 U1 | 8/2015 |
| EP | 1 790 437 A2 | 5/2007 |
| TW | 327273 M | 2/1998 |
| TW | 351 280 U | 2/2009 |

OTHER PUBLICATIONS

Office Action (Communication of a notice of opposition) dated Sep. 20, 2018, by the European Patent Office in corresponding European Patent Application No. 15177000.5-1019, (40 pages).

\* cited by examiner

MOUNTING TOOL FOR WHEEL BEARING ASSEMBLIES

TECHNICAL FIELD OF THE INVENTION

The present invention relates and a mounting tool and to a method for mounting wheel bearing assemblies.

BACKGROUND

There is an ever present need to reduce costs and to facilitate the life of workshop (vehicle repair shop) operators, i.e. mechanics. The immense amount of manufacturers in the automotive industry, particularly within the car industry, often leads to an even larger number of repair equipment within the workshops, many times due to the fact that a specific component will have different dimensions depending on which manufacturer it originates from.

Consequently, workshops are oftentimes forced to have a large amount of tools which essentially serve the same purpose which can be both costly and inconvenient. An example of an above mentioned component which many times differs between each respective manufacturer, is a wheel bearing assembly having an inner bearing ring integrated with the hub (also known as a wheel hub assembly, a hub bearing assembly or a compact bearing), which, when it is to be mounted inside a bearing seat many times require a whole arsenal of tools due to the variety of dimensions of the bearings. For example, a known manufacturer of such bearings, SKF AB, currently has 8 different models with 8 different dimensions for their HBU 2.1 bearings.

An often problematic fact about wheel bearing assemblies is that the pressing force must effectively be applied to the outer bearing ring (sometimes called outer ring). This may seem as a cumbersome approach as opposed to merely pressing on the inner ring flange. However, these wheel bearing assemblies are not constructed to handle such an axial load on the inner ring or inner ring flange and therefore, in order to prevent the wheel bearing assembly from breaking, pressure must be applied on the outer bearing ring. This is commonly known in the art, and the recommended course of action from bearing manufacturers, and a strong contributor as to why universal tools for mounting wheel bearing assemblies are rare.

As indicated above it is commonly known to provide a mounting tool for wheel bearings which are specific to every specific model or type of bearing, i.e. specific to a diameter of the bearing. Examples of such tools can be found e.g. in EP1790437 or DE102012006700. As mentioned, this type of solution leads to workshop owners having to purchase one tool for each model (each dimension) of wheel bearing.

Workshop owners and operators often desire universal tools, i.e. tools that can be adjusted to compensate for variations in dimensions, such tools are also known for mounting compact wheel bearings and an example is disclosed in DE102008007805. However, this solution is limited in many ways, and does not completely solve the problem of providing simple universal tool for mounting compact wheel bearings. For example, some car manufacturers have unfortunately placed bolts on their wheel hubs which are not compatible with the mounting tool as presented in DE102008007805. Furthermore, in use, that specific tool can be rather heavy to operate and there is still a lot of room for improvements regarding operational simplicity and cost efficiency.

There is therefore a need for an improved device for mounting wheel bearing assemblies on vehicles, and in particular automobiles, which is cost efficient, easy to operate and universal. Even though the above discussion is focused on cars (or automobiles), similar situations and problems are encountered in many other types of vehicles, such as e.g. busses and trucks.

SUMMARY OF THE INVENTION

It is therefore an object of the present invention to provide a mounting tool and a method for pressing a wheel bearing assembly into a bearing seat of an axle body of a vehicle, which alleviates all or at least some of the above-discussed drawbacks of presently known systems.

This object is achieved by means of a mounting tool and a method for a pressing a wheel bearing assembly into a bearing seat as defined in the appended claims.

According to a first aspect of the present invention, there is provided a mounting tool for pressing a wheel bearing assembly, having an inner ring flange and an outer bearing ring, into a bearing seat of an axle body of a vehicle, said mounting tool comprising:

a supporting member having at least one recessed groove;

two L-shaped holding members each comprising a foot section and a stem section, each holding member having at least one protruding guide portion insertable into said at least one groove, for allowing a non-rotational, sliding movement of the holding members along the supporting member between an open position and an operating position, at least one securing means for fastening the L-shaped holding members to said supporting member in said operating position, wherein the holding members are arranged with the foot sections facing each other, such that, in said operating position, the foot sections are positioned in an intermediate space between the inner ring flange and the outer bearing ring in order to engage the outer bearing ring, wherein each foot section, at the end facing the foot section of the other holding member, has a recess with a shape configured to apply an evenly distributed pressure to outer bearing rings of several different dimensions.

The two rotationally fixed L-shaped holding members are thus slidable along the supporting member to securely engage the space between the inner ring flanges (hubs) and outer rings (sometimes also referred to as outer bearing ring) of bearing assemblies of different sizes. This provides a flexible and versatile mounting tool.

The present invention is based on the realization that currently available mounting tools for wheel bearings are out-dated and many times based on old requirements and components. However, first and foremost they are not particularly universal or simple to handle; thus, there is a lot of room for improvements. Accordingly, the inventors realized that by providing an adjustable tool or a tool having adjustable components, the mounting tool can be made very versatile and compatible with various models of wheel bearing assemblies. Furthermore, in order to ensure that the mounting tool is simple to handle for operators, the number of components or parts should be kept low and the portion of the tool that is to press against the outer ring of the wheel bearing assembly needs to be configured to accommodate for the varying dimensions of the different bearing models. The different models are often a consequence of different dimensions of bearing seats and/or axle bodies from different vehicle manufacturers, and therefore, many times the diameter of the outer bearing ring and/or the inner ring flange can differ between the different bearing models.

Accordingly, the portion of the tool pressing against the outer ring, i.e. the foot section in accordance with the invention, is configured to maximize the pressing surface while still providing a dynamic enough tool to be compatible with a number of models. Each foot section has a recess with a shape configured to press evenly against at least one portion of an edge surface (or rim surface) of the outer ring of the wheel bearing assembly. Moreover the shape allows for the mounting tool to be compatible with wheel bearing assemblies of different dimensions. The shape of the recess further ensures that, when the foot sections are brought in engagement with the outer ring, pressure is applied on a large enough part of an edge surface of the outer ring, to ensure safe operation for wheel bearing assemblies having different dimensions.

Further, the two L-shaped holding members can be fastened to the supporting member at various distances from each other, i.e. the two L-shaped holding members are adjustable or moveable along the supporting member. This is in order to be able to use the mounting tool on wheel bearing assemblies having varying dimensions, e.g. varying diameters of the inner ring flange and/or varying diameters of the outer ring. For example, the holding members may be fastened in an operating position when the tool is used and when the tool is to be removed from the wheel bearing assembly an operator can simply release the securing means and move the holding members outwards away from the center in order to facilitate the disengagement of the tool around the wheel bearing assembly.

Even further, the supporting member is provided with at least one recessed groove. The recessed groove is located on the side of the supporting member which is to engage the L-shaped holding members, i.e. the bottom side in some of the above examples. The L-shaped holding members are accordingly each provided with at least one protrusion or at least one protruding guide portion which is insertable into the at least one recessed groove. The aforementioned bore hole may be located in the protruding guide portion in some of the exemplary embodiments where the securing means is a screw or a bolt. The recessed groove of the supporting member together with the protruding guiding portion(s) of the L-shaped holding member(s) allow for the L-shaped holding member(s) to be moved in a non-rotational sliding manner along the supporting member between an open position and an operating position. Thus, the L-shaped holding members are accordingly arranged so they cannot twist or turn when brought into engagement with the outer bearing ring of the wheel bearing assembly (operating position), ensuring that both of the L-shaped holding member(s) and their corresponding foot sections are in good alignment with reference to each other, and that the applied pressure is evenly spread across an edge surface of the outer bearing ring. The securing means are then used to fasten the L-shaped holding members in the operating position, i.e. the position where the two L-shaped holding members and their corresponding foot sections are arranged in the intermediate space between the inner ring flange and the outer bearing ring of the wheel bearing assembly.

The supporting member may also be viewed as a base member, having a top side and a bottom side where the L-shaped holding members are fastened to the bottom side by at least one securing means. The securing means is in one exemplary embodiment a separate element, i.e. it is not a part of the supporting member or the L-shaped holding member. The securing means may be a screw or a bolt having a head portion and a threaded portion. The threaded portion is then inserted through an opening provided on the supporting member and engages a matching bore hole provided on the L-shaped holding member. In other exemplary embodiments the securing means may be a magnetic arrangement, a click-push type or a combination of all of the above.

In one exemplary embodiment the recess has a shape comprising a first arc having a first radius located between two arcs having a second radius, and where the second radius is larger than the first radius. The arcs are to be understood as portions of a circumference of a circle, i.e. the radius of an arc is essentially the radius of the circle/circumference that the arc is a portion of. Moreover, the recess may have an edge/shape which comprises an additional two arcs having a third radius, wherein the three arcs having a first radius and a second radius are located between the two arcs having a third radius, and wherein the third radius is larger than the second radius. The shape of the recess may comprise further pairs of arcs located on each side of the group of arcs in an incremental and symmetrical manner with respect to their radii, i.e. following the same pattern as discussed above.

These configurations of the shape of the recess make sure that the interface between the foot section of each L-shaped holding member and the outer bearing ring has a large enough contact surface across a wide range of models (dimensions) of wheel bearing assemblies. Alternatively, according to other exemplary embodiments the recess may have a substantially semi-circular, semi-elliptical, parabolic or hyperbolic edge or shape. All of these alternative embodiments allow for a universal mounting tool which is compatible with various wheel hub assembly models of different dimensions and may be combinable with each other, i.e. the recess could have a substantially parabolic shape comprising a plurality of arcs or it could have a substantially elliptical shape comprising a plurality of arcs, etc.

According to another exemplary embodiment the recess further has a centrally located slot in towards the stem section. The slot may be U-shaped, rectangular, oval or any shape allowing for a portion of a bolt or a protrusion which may be present on some inner ring flanges on particular wheel bearing assembly models, to be temporarily accommodated in the slot. This allows for an even more universal mounting tool which then accordingly is compatible with additional wheel bearing assembly models. Also, it facilitates the work of an operator in such a manner that the bolts which may be present on some inner ring flanges do not have to be removed in order to successfully mount the complete bearing unit in a bearing seat of an axle body of a vehicle.

In another exemplary embodiment the securing means comprises a first set of threaded bolts insertable through an elongated opening in the supporting member in order to engage a set of matching bore holes provided in the stem section of each L-shaped holding member. The elongated opening is elongated with reference to the long axis of the supporting member, i.e. it allows for a threaded bolt or a screw to move along the long axis of the supporting member within this elongated opening. Thus, a simple means for precise adjustment of the placement or position of the L-shaped holding members along a long axis of the supporting member is achieved.

In another exemplary embodiment the abovementioned set of bolts is a first set and where the securing means further comprises a second set of threaded bolts arranged perpendicularly to each first set of threaded bolts and configured to press against the first set of threaded bolts. The second set of threaded bolts, which is optional, is/are screwed in perpendicularly along the long axis of the securing member through an opening provided on the securing member towards the first set of threaded bolts, and thereby allowing for a more secure fastening arrangement for the mounting tool. This is because the second set of threaded bolts further prevents the first set of threaded bolts and consequently the L-shaped holding members from moving outwards towards the edges of the supporting member which could potentially damage the mounting tool or the bearing and even potentially injure an operator/user handling the mounting tool, in particular when pressing forces of large magnitude are involved. A set of objects should be interpreted as at least one object, i.e. a set of bolts could be one, two or several bolts. However, the mounting tool may also use a single bolt for each holding member.

In another exemplary embodiment the second set of threaded bolts may be provided with markings indicating the position of the L-shaped holding members. The markings may also be arranged to indicate for which model of the plurality of models of wheel hub assemblies the L-shaped holding members are presently configured or positioned. The markings may alternatively be arranged on a surface of the supporting member. By providing markings indicating which model the holding members are currently positioned for, errors when handling the tool may be minimized since the operator can early on be aware of any misalignments or erroneously positioned holding members.

The mounting tool may in some exemplary embodiments be connectable to a pressing device such as for example, a hydraulic cylinder, a mechanical spindle, a tension rod or a hydraulic garage press (workshop press). In one exemplary embodiment the supporting member comprises a centrally located opening and wherein the opening has a central axis substantially coinciding with a central axis of the wheel bearing assembly when the holding members are arranged in an operating position. This simplifies the mounting together with a pressing device comprising a pulling rod, such as a hydraulic cylinder and ensures that pressure is evenly spread since the pressing force is centralized. Some wheel hub assemblies do however not have a central opening, thus, hydraulic cylinders are not compatible with such wheel hub assemblies, and instead a hydraulic garage press may be used. The mounting tool is then arranged on the garage press where it may act as a counter-hold and the pressing is effectively done by a pressing device moving a bearing seat of an axle body or wheel spindle towards the wheel hub assembly. In the case where a garage press is used, it can be viewed as if the wheel spindle or axle body is mounted on the wheel bearing assembly.

According to another aspect of the present invention, there is provided a method for mounting a wheel bearing assembly, having an inner ring flange, an outer bearing ring and a central through hole, into a bearing seat of an axle body, said method comprising:

providing a mounting tool in accordance with the first aspect of the invention and where the supporting member further comprises a central opening through which a pulling rod of a pressing device can be inserted, positioning each foot section of the L-shaped holding members in an operating position by arranging each foot section in an intermediate space between the inner ring flange and the outer bearing ring in order to engage the outer bearing ring, fastening each L-shaped holding member to the supporting member in said operating position with said securing means, providing a pressing device comprising a pulling rod, moving an end portion of said pulling rod through the central opening of the supporting member, through the central through hole of the wheel bearing assembly and further through the bearing seat, fastening a counter-hold on the end portion of said pulling rod, actuating said pressing device in order to apply a pulling force to said pulling rod and thereby applying a pressing force on the outer bearing ring towards said bearing seat via said foot sections of the L-shaped holding members.

With this aspect of the invention, similar advantages and preferred features are present as in the previously discussed first aspect of the invention.

These and other features and advantages of the present invention will in the following be further clarified with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

All the figures are highly schematic, not necessarily to scale, and they only show parts which are necessary in order to elucidate the invention, other parts being omitted or merely suggested.

DETAILED DESCRIPTION

In the following detailed description, preferred embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention.

In the following the tool is referenced together with wheel bearing assemblies where the wheel hub and the bearing together form a single unit, more specifically, bearings with an inner ring flange (also known as hub). These types of assemblies are also known as a hub bearing unit (HBU) or hub bearing assembly, wheel hub bearings etc. An example of such a bearing is the HBU generation 2.1 wheel bearing by SKF AB which was first presented more than a decade ago, and since then a total number of 8 models of HBU 2.1 bearings with varying dimensions have been introduced. Other examples of providers/manufacturers of such wheel bearing assemblies are FAG, Schaeffler and Ruville. The bearing diameter for all of those eight currently available HBU 2.1 bearings by SKF AB varies between 62 mm and 96 mm, and the flange/hub diameter varies between 116 mm and 153 mm. The mounting tool according to the present invention is compatible with any one of those 8 bearing dimensions. The mounting tool according to the present invention is in fact compatible with bearing diameters from 50 mm up to 105 mm. Moreover, it is known in the art to equip some of these bearings with a locking ring located around the outer bearing ring, the mounting tool according to the invention is however compatible with wheel bearing assemblies having these locking rings as well as wheel hub bearing assemblies not having these locking rings.

Figure 1:
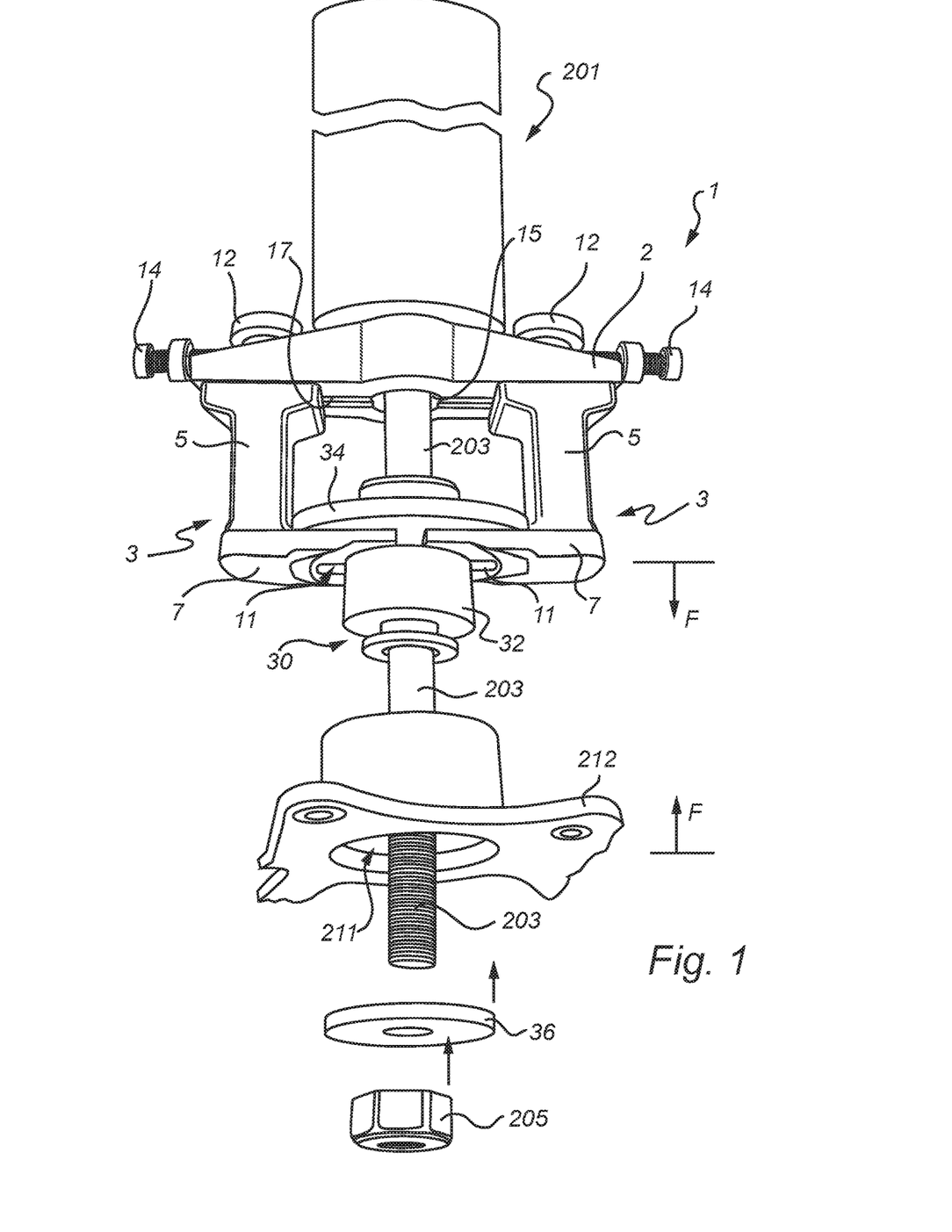
FIG. 1 is a perspective, partially exploded, view of a mounting tool together with a pressing device arranged on a wheel bearing assembly and a portion of an axle body of a vehicle to facilitate the understanding of how the wheel bearing assembly is pressed into a bearing seat in accordance with an embodiment of the present invention.

FIG. 1 shows a perspective and partially exploded view of a mounting tool 1 arranged on a wheel bearing assembly 30 together with a pressing device, here in the form of a hydraulic cylinder 201. The mounting tool 1 along with its components are preferably made from a rigid material such as any metal, it can however be made from other materials depending on the desired application as will be obvious for one skilled in the art. The method for manufacturing such a tool using a metallic material is considered to be well known in the art and for the sake of brevity omitted in the following. The figure further shows a portion of an axle body 212 of a vehicle, such as a car, with a bearing seat 211, into which, the wheel bearing assembly 30 is to be mounted/inserted.

The L-shaped holding members 3 of the tool are securely fastened in an operating position, where the foot sections 7 of the L-shaped holding members 3 are arranged in an intermediate space between the inner ring flange 34 (sometimes called hub) and the outer bearing ring 32 (sometimes called outer ring) of the wheel bearing assembly 30. The holding members 3 are fastened to the supporting member 2 by securing means, here in the form of a pair of bolts 12, 14 for each holding member 3, where a first bolt 12 engages a matching bore hole (13 FIG. 3) provided in the stem section 5 of the L-shaped holding members 3 via an elongated opening (16 FIG. 3) in the supporting member 2. The supporting member 2 further has a second bolt 14 arranged on the supporting member to further ensure that the L-shaped holding members 3 do not succumb to the pressing forces and move from the operational position to an open position, i.e. move away from each other outwards from the wheel bearing assembly 30. The stem section 5 of the L-shaped holding members 3 further has a protruding guide portion (19 FIG. 3) which is arranged in a matching recessed groove 17 of the supporting member 3. As previously mentioned, the protruding guide portion(s) 19 together with the recessed groove 17 aids in aligning the L-shaped holding members in the center of the supporting member 2 and in a straight alignment in relation to each other, thus ensuring that the pressing force exerted on the edge surface of the outer bearing ring 32 is evenly spread. In other words, the holding members 3 can be moved along a long axis of the supporting member 2 in a non-rotational manner, thus no misalignment where one holding member 3 is slightly offset compared to the opposite holding member 3 can occur. An offset could have devastating consequences since it could mean that pressure is applied in an unbalanced way, which could damage the tool 1 or the bearing 30, or even cause personal injury to the operator/user. The holding members further have a slot 11 in order to be compatible with models of wheel bearing assemblies having bolts or parts of bolts protruding from the flange 34 (not shown).

Further, the supporting member 2 is connectable to a pressing device, such as e.g. a hydraulic cylinder 201, schematically illustrated in the figure (FIG. 1). The supporting member 2 comprises an opening 15 through which a portion or a part of the pressing device 201 may be inserted, e.g. a tension rod/pulling rod 203 of the hydraulic cylinder 201, which will mostly be referred to as a rod 203 in the following. The rod 203 is further moved through the wheel bearing assembly 30 and through a bearing seat 211 of an axle body 212 of a vehicle (not shown). Next, a pressing plate 36 is arranged around the rod 203 on the opposite side of the bearing seat 211, viewed from the mounting tool 1. The pressing plate 36 is followed by a nut 205 which is fastened on the rod 203 in order to act, together with the pressing plate 36, as a counter-stay or a counter-hold for when the hydraulic cylinder 201 applies a compressing force (as indicated by arrows F) which effectively moves the rod 203 inwards towards the hydraulic cylinder 201, which in turn translates to a pressing force on to the mounting tool 1 which then transfers the pressing force to a surface of the outer bearing ring 32 via the foot sections 7 of the L-shaped holding members 3. The mounting tool 1 is preferably made from a material having a tensile strength larger than 1200 N/mm$^2$ (1200 MPa) in order to be compatible with a hydraulic cylinder 201 capable of delivering a pressing force of 22 metric ton (roughly 220 kN of pressing force) and accordingly to withstand such a pressing force. The mounting tool 1 may for example be made from toughened or hardened steel. However, the mounting tool 1 can be made from weaker materials capable of withstanding pressing forces of up to 7 metric ton (roughly 70 kN of pressing force), depending on the desired application.

Once the wheel bearing assembly 30 has been positioned within the bearing seat 211, the counter-hold, i.e. the nut 205 and the pressing plate 36 are removed and the fastening elements 14 and the securing elements 12 are loosened enough in order to allow the L-shaped holding members 3 to be moved outwards out from the intermediate space between the inner ring flange 34 and the outer bearing ring 32 to an open position, and lastly the mounting tool 1 and the pressing device 201 may be removed, leaving a mounted wheel bearing assembly 30.

However, some wheel bearing assemblies may not have a central opening which makes them incompatible with a pressing device comprising a tension/pulling rod 203, such as e.g. a hydraulic cylinder 201; instead the mounting tool 1 and such wheel bearing assemblies may be used together with a garage press (not shown). The method regarding usage of the mounting tool in combination with a (hydraulic) garage press is omitted for the sake of brevity; the skilled person will however readily known how the mounting tool arranged on a wheel bearing assembly (being in an operating position) is to be arranged within the garage press, or combined with any other pressing device such as a mechanical spindle, tension rod, etc.

Figure 2:
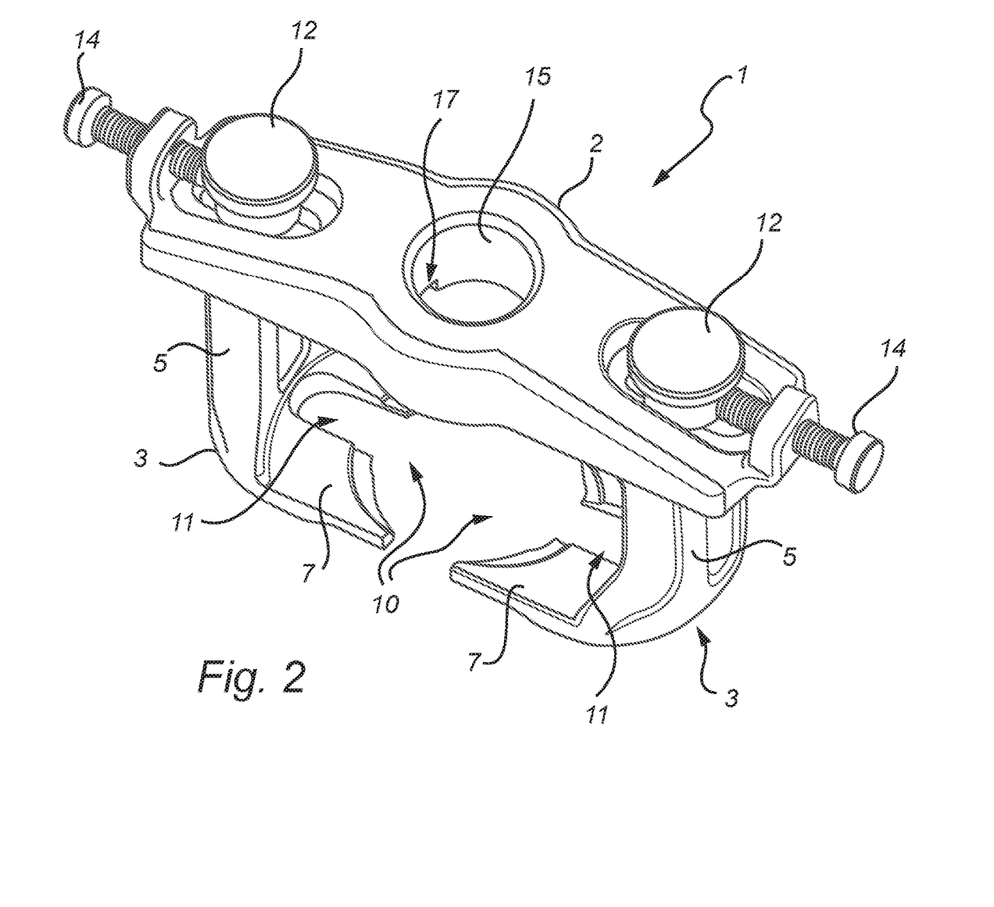
FIG. 2 is a perspective view of a mounting tool in accordance with another embodiment of the present invention.

FIG. 2 is a perspective of a mounting tool 1 for pressing a wheel bearing assembly, having an inner ring flange and an outer bearing ring, into a bearing seat 211 of an axle body 212. The mounting tool 1 has a supporting member 2 and two removable and/or adjustable L-shaped holding members 3. The supporting member comprises at least one recessed groove 17 on at least one side of the supporting member 2. The recessed groove 17 is used to accommodate a protruding guide portion (19 in FIG. 3) of the stem section 5 of the L-shaped holding members 3, in order to ensure good alignment of the foot sections 7 in relation to each other, and to the supporting member 2.

Each L-shaped holding member 3 has a foot section 7 with a recess 10. In this exemplary embodiment the foot section 7 further has a slot 11. The slot 11 allows the mounting tool 1 to accommodate portions of bolts which are present on some models of wheel hub assemblies 30, while still ensuring that a pressing surface (18 in FIG. 5) on the bottom side of the foot section 7 engages a large enough portion/surface of the outer bearing ring 32 for those models as well.

The mounting tool 1, further comprises securing means, here in the form of threaded bolts 12, 14, the threaded portion of the first set of bolts 12 engage matching bore holes (13 in FIG. 3) provided on the stem section 5 of the L-shaped holding members 3. A head portion of the first set of threaded bolts 12 presses against a surface on the supporting member 2 in order to fasten the L-shaped holding members 3 to the supporting member 2. Furthermore, a second set of threaded bolts 14, are provided on the supporting member 2. The second set of threaded bolts 14 may for example be used to set the position of the L-shaped holding members 3 with good precision. Moreover, the second set of threaded bolts 14 may also provide an extra security measure so that the L-shaped holding members 3 do not move outwards towards the edges of the supporting member 2 during use of the mounting tool 1, i.e. when pressing in a wheel bearing assembly 30 into a bearing seat 211, which could potentially damage equipment or pose a safety hazard for operators. Also, the fastening elements 14 could be provided with markings (not shown) which indicate the position of the L-shaped holding members 3 and thus an operator or user could be informed of the current setting of the tool, e.g. which model of wheel bearing assemblies it currently is adjusted/configured for.

Further, the supporting member comprises an opening 15 for arranging a pressing device 201, such as e.g. a hydraulic cylinder, in order to apply enough pressing force for the wheel bearing assembly 30 to be easily pressed into a bearing seat 211.

Figure 3:
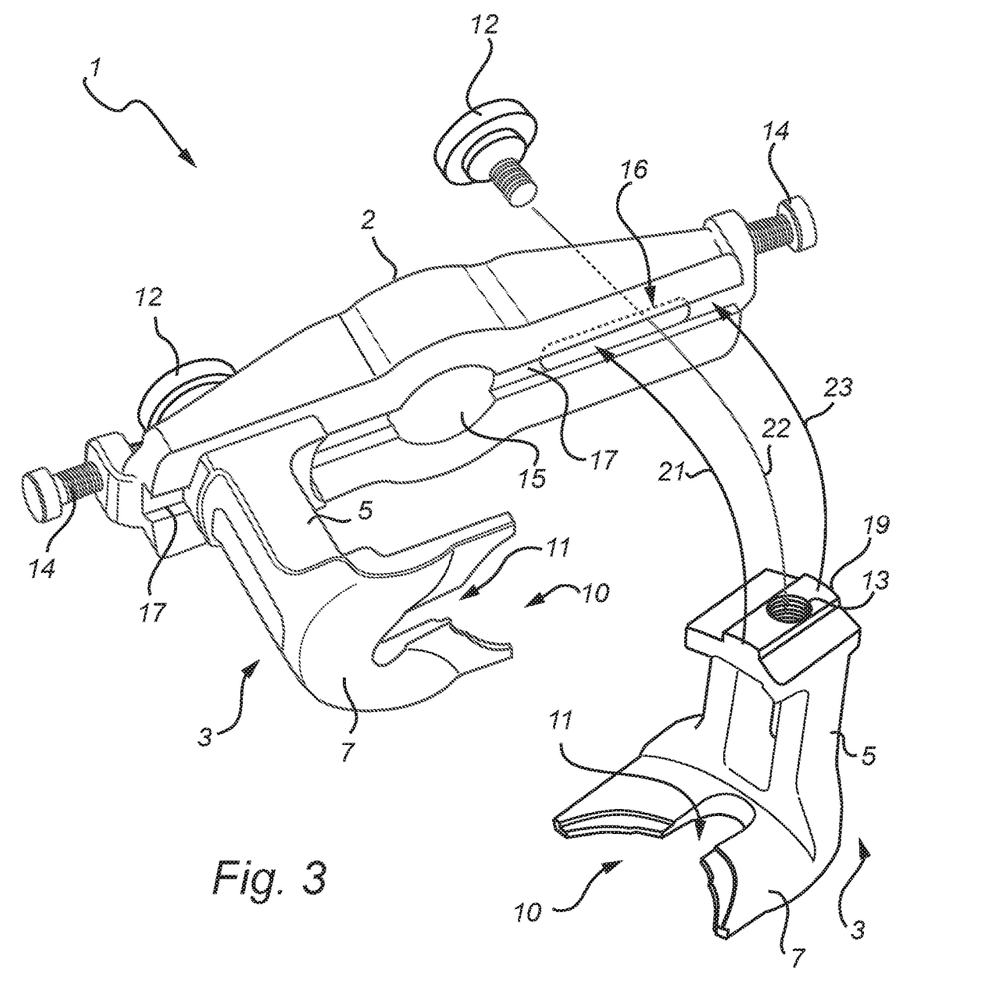
FIG. 3 is a semi-exploded perspective view of a mounting tool in accordance with another embodiment of the present invention.

FIG. 3 is a semi-exploded perspective view of a mounting tool 1 in accordance with an embodiment of the invention. In this illustration one of the two L-shaped holding members 3 have been disengaged from the supporting member 2 in order better show how the mounting tool 1 is assembled. Furthermore, a better view of the recessed groove 17 and the corresponding protruding guide portion 19 of the stem section 5 is provided. The L-shaped holding members 3 can be fastened to the supporting member 2 as indicated by the arrows 21, 22, 23; here one can also see the matching (threaded) bore hole 13 in the stem section 5 of the L-shaped holding member(s) 3. FIG. 3 further shows an elongated opening 16 through which the threaded portion of the first bolt 12 extends in order to engage the L-shaped holding member(s) 3. The elongated opening 16 allows the bolt 12 and accordingly the L-shaped holding member 3 to be fastened at varying distances from each other (or from the center of the supporting member 2) in order to be compatible with different models of wheel bearing assemblies. An additional advantage is that disengagement of the mounting tool 1 from the wheel bearing assembly 30 is made easier.

Figure 4A:
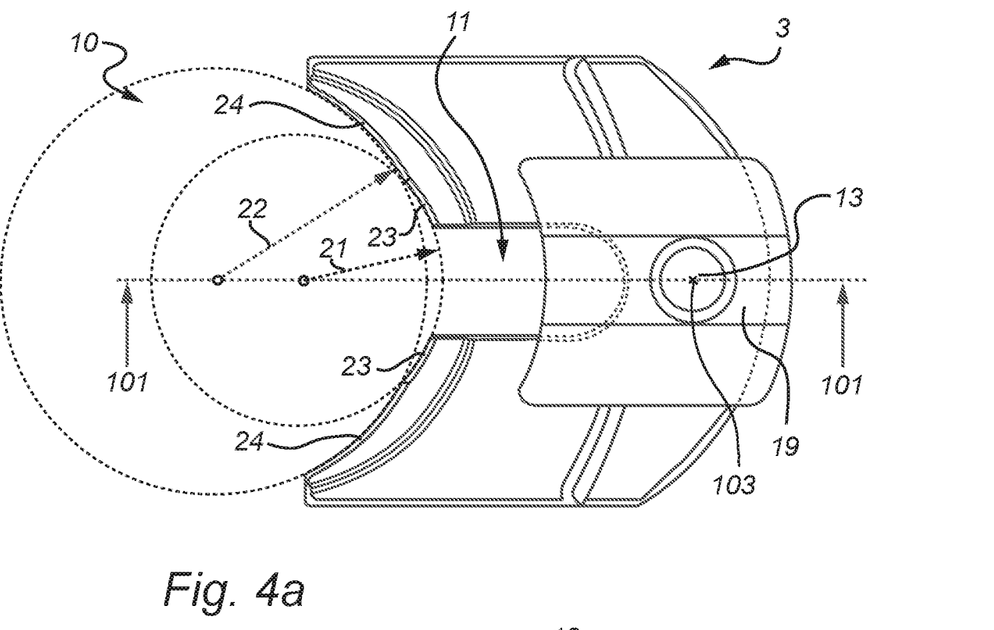
FIG. 4a is a top view of an L-shaped holding member of a mounting tool in accordance with another embodiment of the invention.

FIG. 4a shows a top view of an L-shaped holding member 3 according to one exemplary embodiment of the invention. This view of the L-shaped holding member 3a shows an edge/shape configuration of the recess 10 of the foot section 7. The edge/shape comprises a plurality of arcs of different radii 21, 22. The edge comprises a first arc 23, which is a portion of a circumference of a circle having a first radius 21, and on each side of the first arc 23 there are two substantially equal parts of a second arc 24 (it may also be viewed as two separate arcs having the same radius) having a second radius 22. Further, the first radius 21 is chosen to be smaller than the second radius 22. To further illustrate the shape of the recess 10, dashed lines are provided to show the relationship between the edge/shape of the recess 10 and the figurative circles to clarify the arc terminology. The two central points of each arc are also displaced, where the innermost arc has a central point closer to the stem section than the outermost arc. Moreover, a U-shaped slot 11 for additional compatibility with particular wheel bearing assemblies having protruding bolts, such as e.g. wheel bearing assemblies for Smart 4×4, Mitsubishi Colt, etc., can be seen. For example, the radius 21 of the first (innermost) arc 23 may be 25-31 mm and the radius 22 of the outermost arc(s) 24 may be 35-45 mm, and the center point of the circle of the first arc 23 may be 70-80 mm from the center point 103 of the bore hole 13, while the center point of the circle of the second arc(s) 24 may be 79-99 mm from the center point 113, along the line 101. The dimensions discussed above are merely examples and should be regarded as limiting for the tool according to the invention, instead it should be treated as elucidating and will depend on the intended application.

Figure 4B:
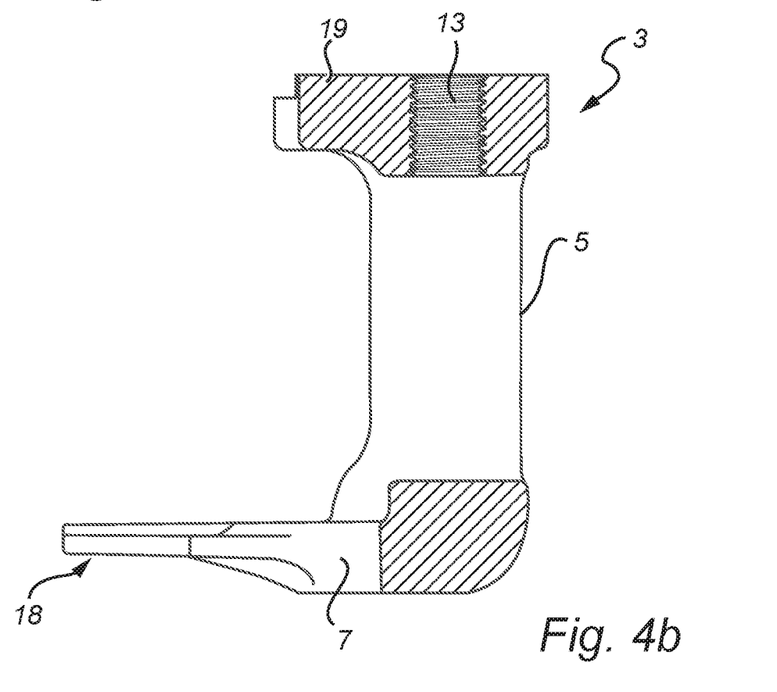
FIG. 4b is a cross-sectional side view of an L-shaped holding member of a mounting tool in accordance with another embodiment of the invention.

FIG. 4b shows a cross-sectional view taken generally on line 101 in FIG. 4a, of an L-shaped holding member 3 of an exemplary embodiment of the mounting tool 1. Further, the tapered shape of the foot section 7 can be seen, as well as the substantially flat pressing surface 18. The shape of the pressing surface 18 of the foot section 7 is arranged, when in an operating position, so that a pressing force applied on the mounting tool 1 is evenly spread over a maximal surface area of the edge surface of an outer bearing ring 32, while still providing compatibility with wheel bearing assemblies 30 of different dimensions.

Figure 5:
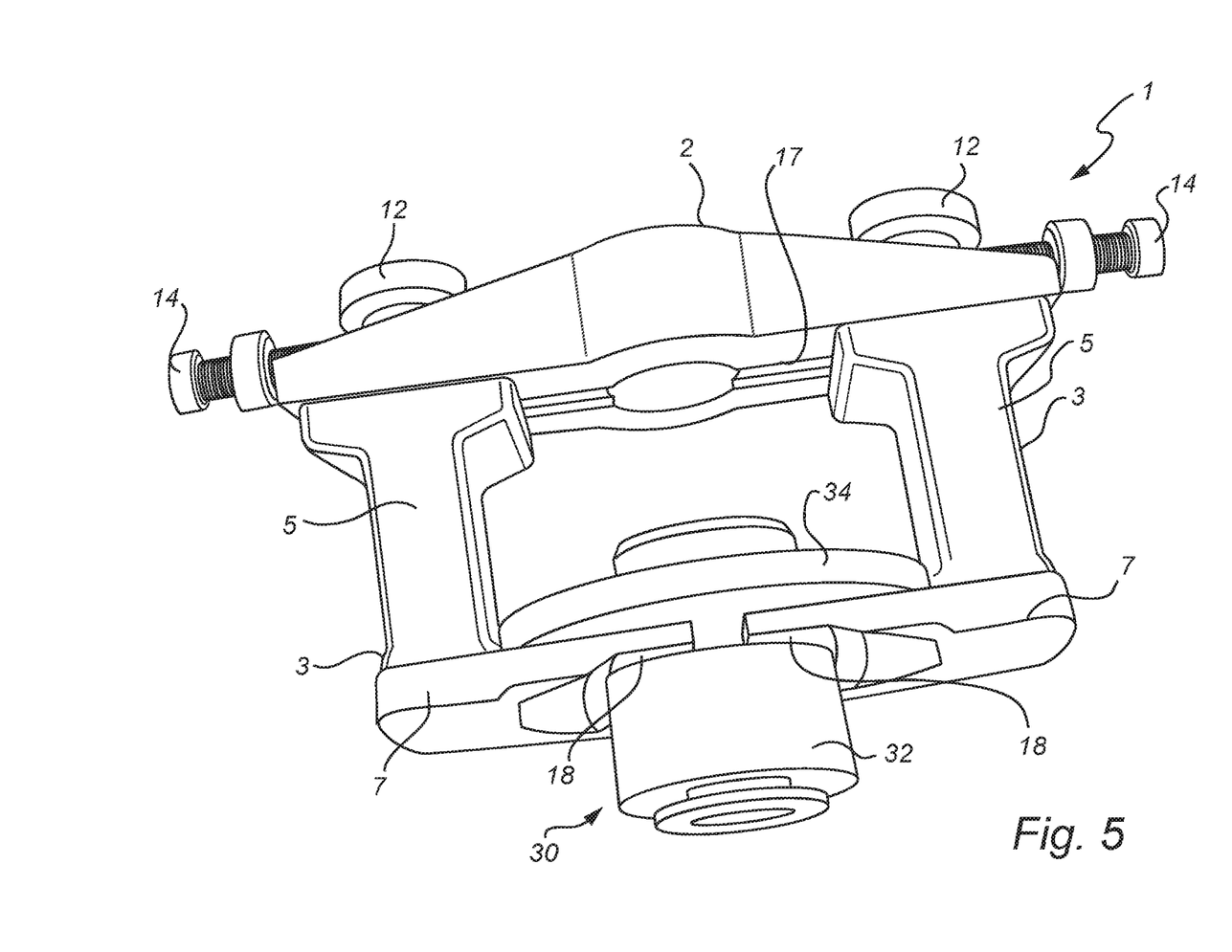
FIG. 5 is a perspective view of a mounting tool arranged on a wheel bearing assembly in accordance with another embodiment of the present invention.

FIG. 5 shows a perspective view of a mounting tool 1 assembled or arranged on a wheel bearing assembly 30. As can be seen, each L-shaped holding members 3 are fastened to the supporting member 2 with some securing means, here in the form of a first screw or bolt 12 and a second screw or bolt 14. Further, the foot sections 7 of the holding members 3 are arranged in an intermediate space between the outer bearing ring 32 and the inner ring flange 34 of the wheel bearing assembly 30, i.e. the holding members 3 are arranged in an operating position. In operation, the mounting tool 1 is used to press on a surface of the outer bearing ring 32 in order to mount the wheel bearing assembly 30 into a bearing seat 211 of an axle body 212 of a vehicle, such as a car. The pressing surface 18 of the foot section 7 is arranged to be substantially flat in order to spread out the applied pressing force across the edge surface of the outer bearing ring 32. The edge surface should be interpreted as the surface of the outer bearing ring that is facing the intermediate space into which the foot section 7 is insertable.

Figure 6:
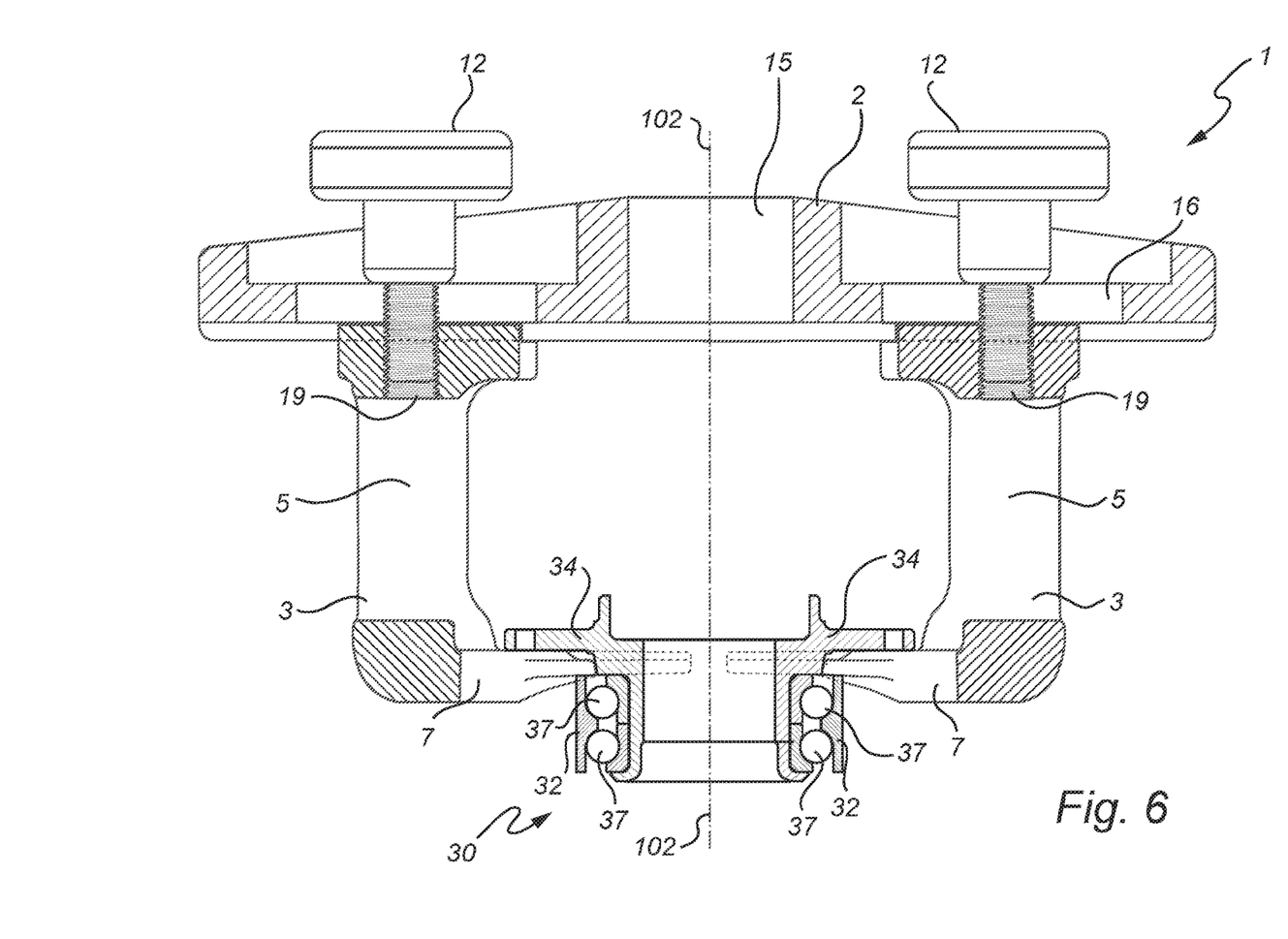
FIG. 6 is a cross-sectional view of a mounting tool arranged on a wheel bearing assembly in accordance with another embodiment of the present invention.

FIG. 6 shows a cross-sectional view of a mounting tool 1 arranged on a wheel bearing assembly 30. The L-shaped holding members 3 are fastened to the supporting member 2 with the help of some securing means 12. The securing means 12, here in the form of a bolt 12, engages a matching bore hole 19 in the stem section 5 of the L-shaped holding member(s) 3. The L-shaped holding members 3 may be fastened, with the bolt 12, to the supporting member 2 at various positions enabled by the elongated hole 16, which allows the bolt(s) 12, and consequently the L-shaped holding member(s) 3 to be moved to different positions along a long axis of the supporting member 2. The L-shaped holding member(s) 2 can therefore be moved between an operating position and an open position, a recessed groove 17 together with a protruding guide portion 19 allows the holding member(s) to be moved between these positions in a non-rotational manner. Further, a cross-section of the wheel bearing assembly 30 is shown in the figure which shows a schematic structural principle of a wheel bearing assembly 30. Here, one can see the interface between the outer bearing ring 32 and a pressing surface (18 in FIG. 5) of the foot section 7 of the L-shaped holding member 3. The foot section 7 is arranged in an intermediate space between the inner ring flange 34 and the outer bearing ring 32, where it is brought in contact with the outer bearing ring. Furthermore, bearing elements 37 are illustrated between the outer bearing ring 32 and the inner ring flange 34, in the form of rolling balls 37.

Even further, a central line 102 is illustrated to show a hollow space suitable for arranging a pressing device 201, such as e.g. a hydraulic cylinder, to facilitate the pressing of the wheel bearing assembly 30 into a bearing seat 211 of an axle body 212. A shaft or a rod 203 of a pressing device 201 may accordingly be inserted through opening 15 and along the central line 102 through a central opening of the wheel bearing assembly 30 and eventually further through a bearing seat 211 as previously discussed. The opening 15 has a central axis substantially coinciding with a central axis of the wheel bearing assembly, when the mounting tool is arranged in an operating position. However, some wheel bearing assembly models may not have a central opening, in such cases a hydraulic garage press (not shown) may be used together with the mounting tool 1 instead.

Figure 7A:
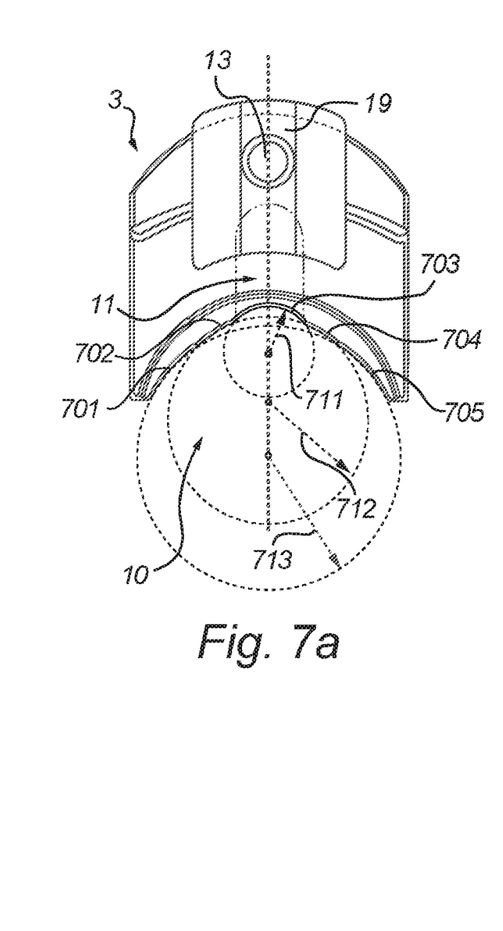
FIGS. 7a-c each show a top view of an L-shaped holding member of a mounting toll in accordance with further embodiments of the present invention.
Figure 7B:
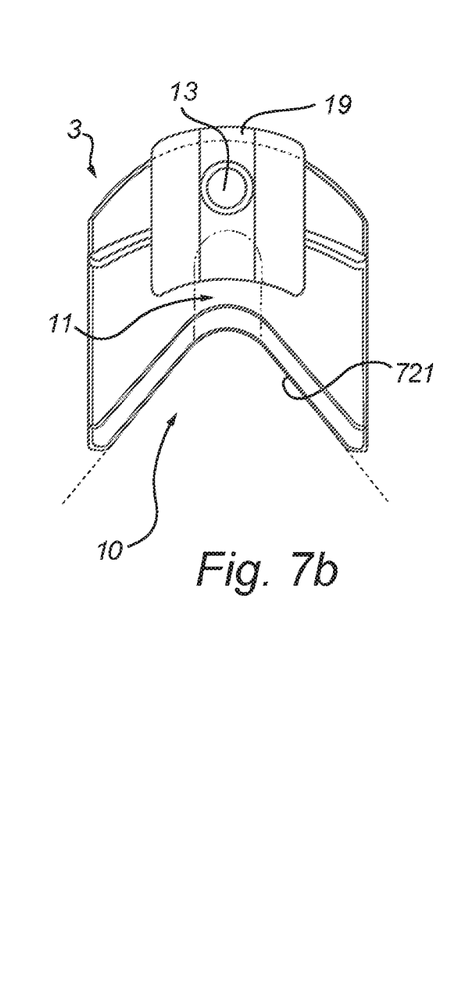
Figure 7C:
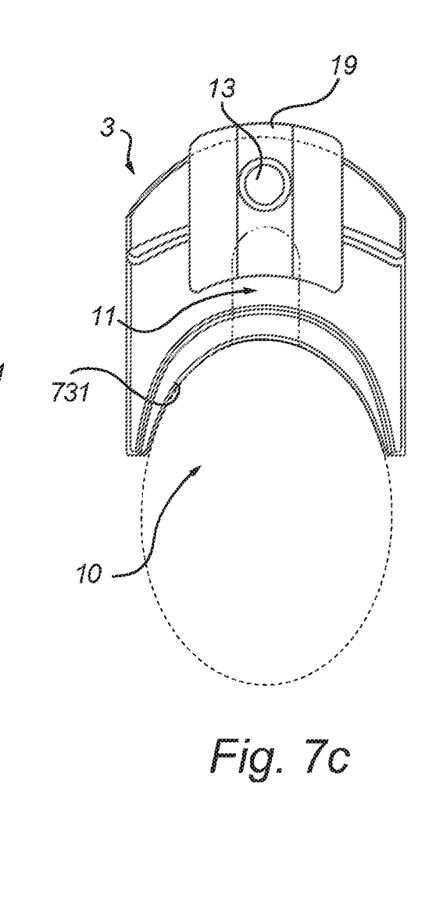

FIGS. 7*a-c* each show top views of an L-shaped holding member 3 of a mounting tool 1 in accordance with some exemplary embodiments of the present invention. All three of the exemplary embodiments illustrated in FIGS. 7*a-c* show a holding member 3 having a bore hole 13 for receiving a threaded bolt 12 and a protruding guide portion 19 insertable into the recessed groove 17 of the supporting member 2. FIG. 7*a* illustrates a recess 10 having a substantially semi-circular edge having 5 arcs 701, 702, 703, 704, 705 having 3 different radii 711, 712, 713. The edge further has a first arc 703 having the smallest radius 711 centrally located, and the remaining arcs 701, 702, 704, 705 are located on both sides of the first arc 703 in a symmetrical and incremental manner towards the edges with respect to their radii 712, 713, i.e. the arcs which are portions of a circumference having a smaller radius are located closer to the center of the foot section than the arcs which are portions of a circumference having a larger radius. The recess 10 may also further include a slot 11 as an option, as illustrated by the dashed lines. The shape of the recess 10, or the edge of the recess 10 depending on how one views it, may as previously mentioned comprise even more arcs as long as there are arranged in the same manner as discussed above.

FIG. 7*b* is a top view of an L-shaped holding member 3, illustrating a recess 10 having a substantially parabolic shape 721 and FIG. 7*c* illustrates a recess having a substantially semi-elliptical shape 731.

The invention has mainly been described above with reference to a few embodiments. However, as is readily appreciated by a person skilled in the art, other embodiments than the ones disclosed above are equally possible within the scope of the invention, as defined by the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

The invention claimed is:

1. A mounting tool for pressing a wheel bearing assembly, having an inner ring flange and an outer bearing ring, into a bearing seat of an axle body of a vehicle, said mounting tool comprising:
    a supporting member having at least one recessed groove;
    two L-shaped holding members each comprising a foot section and a stem section, each holding member having at least one protruding guide portion insertable into said at least one groove, for allowing a non-rotational, sliding movement of the holding members along the supporting member between an open position and an operating position,
    at least one securing means for fastening the L-shaped holding members to said supporting member in said operating position,
    wherein the holding members are arranged with the foot sections facing each other, such that, in said operating position, the foot sections are positioned in an intermediate space between the inner ring flange and the outer bearing ring in order to engage the outer bearing ring,
    wherein each foot section, at the end facing the foot section of the other holding member, has a recess with a shape configured to apply an evenly distributed pressure to outer bearing rings of several different dimensions, the shape comprising a first arc having a first radius located between two arcs having a second radius, wherein the second radius is larger than the first radius.

2. The mounting tool according to claim 1, wherein said recess has a shape further comprising two arcs having a third radius, wherein the three arcs having a first radius and a second radius are located between the two arcs having a third radius, and wherein the third radius is larger than the second radius.

3. The mounting tool according to claim 1, wherein said recess further has a centrally located slot in towards the stem section.

4. The mounting tool according to claim 1, wherein said securing means comprises a set of threaded bolts insertable through an elongated opening in the supporting member in order to engage a matching set of bore holes provided in each L-shaped holding member.

5. The mounting tool according to claim 4, wherein said set of threaded bolts is a first set of threaded bolts, and wherein the securing means further comprises a second set of threaded bolts arranged perpendicularly to each first set of threaded bolts and configured to press against the first set of threaded bolts.

6. The mounting tool according to claim 5, wherein said second set of threaded bolts are provided with markings indicating the position of said L-shaped holding members.

7. The mounting tool according to claim 1, wherein the supporting member comprises a centrally located opening and wherein the opening has a central axis substantially coinciding with a central axis of the wheel bearing assembly when said holding members are arranged in an operating position.

8. A method for mounting a wheel bearing assembly, having an inner ring flange, an outer bearing ring and a central through hole, into a bearing seat of an axle body, the method using a mounting tool including a supporting member having at least one recessed groove; two L-shaped holding members each comprising a foot section and a stem section, each holding member having at least one protruding guide portion insertable into said at least one groove, for allowing a non-rotational, sliding movement of the holding members along the supporting member between an open position and an operating position, at least one securing means for fastening the L-shaped holding members to said supporting member in said operating position, wherein the holding members are arranged with the foot sections facing each other, such that, in said operating position, the foot sections are positioned in an intermediate space between the inner ring flange and the outer bearing ring in order to engage the outer bearing ring, wherein each foot section, at the end facing the foot section of the other holding member, has a recess with a shape configured to apply an evenly distributed pressure to outer bearing rings of several different dimensions, the shape comprising a first arc having a first radius located between two arcs having a second radius, wherein the second radius is larger than the first radius, wherein the supporting member comprises a centrally located opening and wherein the opening has a central axis substantially coinciding with a central axis of the wheel bearing assembly when said holding members are arranged in said operating position, the method comprising:
 positioning each foot section of the L-shaped holding members in said operating position by arranging each foot section in said intermediate space between the inner ring flange and the outer bearing ring in order to engage the outer bearing ring,
 fastening each L-shaped holding member to the supporting member in said operating position with said securing means,
 providing a pressing device comprising a pulling rod,
 moving an end portion of said pulling rod through the central opening of the supporting member, through the central through hole of the wheel bearing assembly and further through the bearing seat,
 fastening a counter-hold on the end portion of said pulling rod,
 actuating said pressing device in order to apply a pulling force to said pulling rod and thereby applying a pressing force on the outer bearing ring towards said bearing seat via said foot sections of the L-shaped holding members.

* * * * *